United States Patent
Suzuki

(10) Patent No.: US 10,804,533 B2
(45) Date of Patent: Oct. 13, 2020

(54) METHOD OF PRODUCING LITHIUM ION SECONDARY BATTERY BY INCORPORATING FLUORINE

(71) Applicant: TOYOTA JIDOSHA KABUSHIKI KAISHA, Toyota-shi, Aichi-ken (JP)

(72) Inventor: Kazuhiro Suzuki, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 222 days.

(21) Appl. No.: 15/863,280

(22) Filed: Jan. 5, 2018

(65) Prior Publication Data

US 2018/0205076 A1   Jul. 19, 2018

(30) Foreign Application Priority Data

Jan. 13, 2017   (JP) .................................. 2017-004257

(51) Int. Cl.
*H01M 4/36* (2006.01)
*H01M 10/0525* (2010.01)
(Continued)

(52) U.S. Cl.
CPC ......... *H01M 4/366* (2013.01); *H01M 4/0435* (2013.01); *H01M 4/133* (2013.01);
(Continued)

(58) Field of Classification Search
CPC .... H01M 4/366; H01M 4/1393; H01M 4/587; H01M 4/622; H01M 4/5835;
(Continued)

(56) References Cited

U.S. PATENT DOCUMENTS

| 2012/0270093 A1* | 10/2012 | Isozaki ................. H01M 4/366 429/156 |
| 2015/0243989 A1* | 8/2015 | Yamada ............ H01M 10/0525 429/231.8 |
| 2016/0372741 A1 | 12/2016 | Chung et al. |

FOREIGN PATENT DOCUMENTS

| CN | 104584286 A | 4/2015 |
| CN | 105940532 A | 9/2016 |

(Continued)

OTHER PUBLICATIONS

Machine translation of JPH0831404, Kidai et al., 1996 (Year: 1996).*

*Primary Examiner* — Maria Laios
*Assistant Examiner* — Kwang Han
(74) *Attorney, Agent, or Firm* — Sughrue Mion, PLLC

(57) ABSTRACT

A method of producing a lithium ion secondary battery includes the following (A) to (E). (A) A negative electrode active material powder having a BET specific surface area of 2.2 $m^2/g$ or more and 5.2 $m^2/g$ or less is prepared. (B) Fluorine is incorporated into the negative electrode active material powder. (C) Wet granules are prepared by mixing the negative electrode active material powder, a water-soluble binder powder, and water. (D) A negative electrode is produced by forming the wet granules into a film form. (E) A lithium ion secondary battery including the negative electrode, a positive electrode, and an electrolytic solution is produced. When the negative electrode active material powder is formed into a pellet having a density of 1.5 $g/m^3$, fluorine is incorporated into the negative electrode active material powder so that the pellet has a water contact angle of 96° or more and 138° or less.

7 Claims, 3 Drawing Sheets

(51) Int. Cl.
*H01M 4/04* (2006.01)
*H01M 4/133* (2010.01)
*H01M 4/583* (2010.01)
*H01M 4/62* (2006.01)
*H01M 4/587* (2010.01)
*H01M 4/1393* (2010.01)
*H01M 4/02* (2006.01)
H01M 4/88 (2006.01)

(52) U.S. Cl.
CPC ......... *H01M 4/1393* (2013.01); *H01M 4/587* (2013.01); *H01M 4/5835* (2013.01); *H01M 4/622* (2013.01); *H01M 10/0525* (2013.01); *H01M 4/88* (2013.01); *H01M 4/8821* (2013.01); *H01M 2004/021* (2013.01); *H01M 2004/027* (2013.01)

(58) Field of Classification Search
CPC ............... H01M 4/133; H01M 4/0435; H01M 10/0525; H01M 4/8821; H01M 4/88; H01M 2004/021; H01M 2004/027; H01M 10/058; H01M 4/0433
See application file for complete search history.

(56) References Cited

FOREIGN PATENT DOCUMENTS

| | | | | |
|---|---|---|---|---|
| JP | 04-206461 A | 7/1992 | | |
| JP | 08-031404 A | 2/1996 | | |
| JP | H0831404 | * 2/1996 | ............. | C01B 31/02 |
| JP | 2015-032554 A | 2/2015 | | |

* cited by examiner

METHOD OF PRODUCING LITHIUM ION SECONDARY BATTERY BY INCORPORATING FLUORINE

INCORPORATION BY REFERENCE

The disclosure of Japanese Patent Application No. 2017-004257 filed on Jan. 13, 2017 including the specification, drawings and abstract is incorporated herein by reference in its entirety.

BACKGROUND

1. Technical Field

The present disclosure relates to a method of producing a lithium ion secondary battery.

2. Description of Related Art

Japanese Unexamined Patent Application Publication No. 2015-032554 (JP 2015-032554 A) discloses a method in which a negative electrode active material powder, a thickening agent, and a solvent are mixed to prepare wet granules, and solidification is then additionally performed, and a paste is prepared through dilution and dispersion.

SUMMARY

In the related art, a negative electrode of a lithium ion secondary battery (hereinafter simply referred to as a "battery") is produced by applying a paste to a surface of a current collector and performing drying. The paste is a particle dispersion solution in which negative electrode active material particles are dispersed in a solvent. The paste contains a large amount of a solvent.

When the paste is dried, heat is applied to the paste. Thus, thermal convection occurs in the paste and a phenomenon in which a binder is lifted from a surface of a coating film (so-called "migration") occurs. In general, the binder inhibits diffusion of lithium (Li) ions. When the binder is unevenly distributed on the surface of the negative electrode, Li ions do not easily diffuse into the negative electrode. As a result, it is thought that a capacity retention rate after a charging and discharging cycle (hereinafter simply referred to as a "capacity retention rate") decreases.

A production method in which a negative electrode is produced by forming wet granules into a film form has also been studied. Wet granules are aggregates of wet aggregated particles (granules). Wet granules are prepared by wet granulation of a negative electrode active material powder. Wet granules may be prepared with a small amount of a solvent compared to the paste. Therefore, in the production method, the migration of the binder is greatly reduced. Thus, there is an expectation of improvement in the capacity retention rate.

However, since wet granules have low spreadability, when wet granules are formed into a film form, coating film defects (for example, pinholes and streaks) may occur due to breaking of wet granules. Thus, an improvement range of the capacity retention rate is limited.

The present disclosure provides a lithium ion secondary battery having an improved capacity retention rate and including a negative electrode produced by wet granules.

The technical configuration and operational effects of the present disclosure will be described below. However, the operation mechanism of the present disclosure includes assumptions. The scope of the present disclosure is not limited according to the correctness of this operation mechanism.

An aspect of the present disclosure relates to a method of producing a lithium ion secondary battery including the following (A) to (E). (A) A negative electrode active material powder having a BET specific surface area of 2.2 $m^2/g$ or more and 5.2 $m^2/g$ or less is prepared. (B) Fluorine is incorporated into the negative electrode active material powder. (C) Wet granules are prepared by mixing the negative electrode active material powder into which fluorine is incorporated, a water-soluble binder powder, and water. (D) A negative electrode is produced by forming the wet granules into a film form. (E) A lithium ion secondary battery including the negative electrode, a positive electrode, and an electrolytic solution is produced. When the negative electrode active material powder into which fluorine is incorporated is formed into a pellet having a density of 1.5 $g/cm^3$, fluorine is incorporated into the negative electrode active material powder so that the pellet has a water contact angle of 96° or more and 138° or less.

In general, when wet granules for a negative electrode are prepared, a water-soluble binder powder is used as a granulation accelerator. A certain amount of time is necessary for the water-soluble binder powder to dissolve in a solvent (water). Moreover, since an amount of water is small, wet granules may be prepared while the water-soluble binder powder is not dissolved in water. It is thought that, when the water-soluble binder powder is not sufficiently dissolved in water, since the viscosity of a liquid component included in the wet granules is low, the spreadability of all of the wet granules decreases. In addition, a water-soluble binder powder that does not dissolve aggregates may cause coating film defects.

In the production method of the present disclosure, before wet granules are prepared (granulated), a negative electrode active material powder is treated with fluorine. That is, fluorine is incorporated into the negative electrode active material powder. Thus, water repellency is imparted to the negative electrode active material powder. Since the negative electrode active material powder exhibits water repellency during granulation, absorption of water into the negative electrode active material powder is reduced. As a result, it is thought that the opportunities for contact between a water-soluble binder powder and water increase, and the water-soluble binder powder is likely to dissolve in the water. Therefore, it is thought that, since the spreadability of the wet granules improves, the occurrence of coating film defects is reduced and the capacity retention rate improves.

The fluorine treatment is performed so that the negative electrode active material powder has specific water repellency. That is, the negative electrode active material powder treated with fluorine has a water contact angle of 96° or more and 138° or less. The water contact angle is an index of water repellency. It is thought that, as the water contact angle increases, water repellency increases. The water contact angle is measured in a pellet having a density of 1.5 $g/cm^3$. The pellet is prepared by pressure-molding a negative electrode active material powder.

When the water contact angle is less than 96°, there is a possibility of the occurrence of coating film defects not being sufficiently reduced. This is thought to be caused by the fact that the negative electrode active material powder does not exhibit sufficient water repellency. Even if the water contact angle exceeds 138°, there is a possibility of the occurrence of coating film defects not being sufficiently reduced. This is thought to be caused by the fact that, since the water repellency of the negative electrode active material powder is too strong, an aqueous solution in which a water-soluble binder powder is dissolved is also repelled by the negative electrode active material powder, and the toughness of the wet granules decreases.

Furthermore, the negative electrode active material powder has a BET specific surface area of 2.2 $m^2/g$ or more and 5.2 $m^2/g$ or less. The BET specific surface area is a specific surface area calculated based on the Brunauer, Emmett, and Teller method (BET method).

When the BET specific surface area of the negative electrode active material powder is less than 2.2 $m^2/g$, there is a possibility of the occurrence of coating film defects not being sufficiently reduced. When the BET specific surface area is small, wetting of granules with water progresses faster during granulation, and the water is thought to ooze out from the granules before a water-soluble binder powder dissolves in the water. As a result, when granules aggregate with each other, since the particle size becomes non-uniform, it is thought that coating film defects cannot be sufficiently reduced. Even if the BET specific surface area of the negative electrode active material powder exceeds 5.2 $m^2/g$, there is a possibility of the occurrence of coating film defects not being sufficiently reduced. This is thought to be caused by the fact that an amount of water absorption of the negative electrode active material powder is large, water is absorbed by the negative electrode active material powder, and it is not possible to ensure the opportunity for contact between a water-soluble binder powder and water.

In the aspect, when the wet granules pass through a roller gap, the wet granules may be formed into a film form. It is thought that, since the wet granules of the present disclosure have favorable spreadability, even if strong shear stress is received in formation through rollers, the occurrence of coating film defects is reduced.

In the aspect, the negative electrode active material powder may include composite particles. The composite particles may include natural graphite and amorphous carbon. The amorphous carbon may cover the surface of the natural graphite.

The surface of natural graphite includes many sites having high reactivity with an electrolytic solution. In order to reduce a reaction between the natural graphite and the electrolytic solution, composite particles in which the surface of natural graphite is covered with amorphous carbon have been proposed. However, when wet granules are formed into a film form, if shear stress is applied to composite particles, the composite particles crack or amorphous carbon is separated therefrom, and thus a newly generated surface of the natural graphite may be exposed. The capacity retention rate is thought to decrease when a newly generated surface of the natural graphite and the electrolytic solution react. Since the wet granules of the present disclosure have favorable spreadability, shear stress applied to composite particles during formation is alleviated. Thus, the capacity retention rate is thought to improve when a newly generated surface of natural graphite is reduced from being exposed.

In the aspect, the water-soluble binder powder may include carboxymethylcellulose particles. Carboxymethylcellulose (CMC) may have water solubility and stickiness appropriate for the production method of the present disclosure.

In the aspect, fluorine may be incorporated into the negative electrode active material powder through contact with a fluorine-containing gas.

In the aspect, the fluorine-containing gas may be changed to plasma.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

An embodiment of the present disclosure (hereinafter referred to as the "present embodiment") will be described below. However, the following description does not limit the scope of the present disclosure.

<Method of Producing Lithium Ion Secondary Battery>

Figure 1:
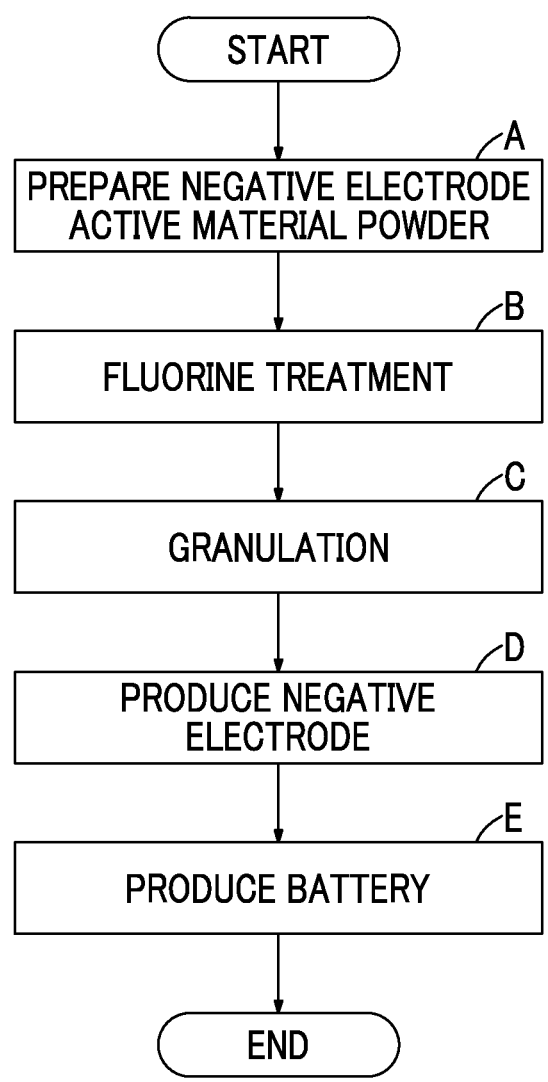
FIG. 1 is a flowchart schematically showing a method of producing a lithium ion secondary battery according to an embodiment of the present disclosure.

FIG. 1 is a flowchart schematically showing a method of producing a lithium ion secondary battery according to an embodiment of the present disclosure. The production method of the present embodiment includes "(A) preparation of negative electrode active material powder," "(B) fluorine treatment," "(C) granulation," "(D) production of negative electrode" and "(E) production of battery." The production method of the present embodiment will be described below in order.

<(A) Preparation of Negative Electrode Active Material Powder>

The production method of the present embodiment includes preparing a negative electrode active material powder having a BET specific surface area of 2.2 $m^2/g$ or more and 5.2 $m^2/g$ or less.

Here, the negative electrode active material powder may be synthesized or the negative electrode active material powder may be purchased. The negative electrode active material powder includes negative electrode active material particles. The shape of the negative electrode active material particles is not particularly limited. The negative electrode active material particles can be, for example, scaly, spherical, or bulky. The negative electrode active material particles may be, for example, graphite, easily graphitizable carbon, non-graphitizable carbon, silicon, a silicon oxide, tin, or a tin oxide. One type of negative electrode active material particle may be used alone or two or more types of negative electrode active material particles may be used in combination.

Graphite may be artificial graphite or natural graphite. Natural graphite has a high initial discharging capacity. However, because the surface of natural graphite includes many sites having high reactivity with an electrolytic solution, capacity deterioration may be easily caused during a charging and discharging cycle. Therefore, natural graphite is preferably covered with amorphous carbon. That is, the negative electrode active material powder may include composite particles. The composite particles include natural graphite and amorphous carbon. Amorphous carbon covers the surface of natural graphite. Composite particles are prepared, for example, as follows. At 50° C. to 100° C., natural graphite and coal-tar pitch are mixed. The mixture is heated at 800° C. to 1000° C. under an inert atmosphere. Therefore, the surface of natural graphite is covered with amorphous carbon. Amorphous carbon may cover the entire surface of natural graphite or cover a part of the surface of natural graphite.

The negative electrode active material powder may have, for example, an average particle size of 1 μm to 30 μm. The average particle size refers to a particle size of cumulative 50% from the side of fine particles in a volume-based particle size distribution measured in a laser diffraction scattering method.

The negative electrode active material powder has a BET specific surface area of 2.2 m$^2$/g or more and 5.2 m$^2$/g or less. The BET specific surface area is measured by a method according to "JISZ8830: method of measuring specific surface area of powder (solid) by gas adsorption." An adsorbing material may be nitrogen gas. The BET specific surface area is measured three times or more. An arithmetic average of BET specific surface areas that are measured three times or more is used as a measurement result.

When the BET specific surface area of the negative electrode active material powder is less than 2.2 m$^2$/g, there is a possibility of the occurrence of coating film defects not being sufficiently reduced. When the BET specific surface area is small, wetting of granules with water progresses faster during granulation, and the water is thought to ooze out from the granules before a water-soluble binder powder dissolves in the water. As a result, when granules aggregate with each other, since the particle size becomes non-uniform, it is thought that coating film defects cannot be sufficiently reduced. Even if the BET specific surface area of the negative electrode active material powder exceeds 5.2 m$^2$/g, there is a possibility of the occurrence of coating film defects not being sufficiently reduced. This is thought to be caused by the fact that an amount of water absorption of the negative electrode active material powder is large, the water is absorbed by the negative electrode active material powder, and it is not possible to ensure the opportunity for contact between a water-soluble binder powder and the water. The BET specific surface area is preferably 2.2 m$^2$/g or more and 3.8 m$^2$/g or less. When the BET specific surface area is 3.8 m$^2$/g or less, there is an expectation of further improvement in the capacity retention rate.

<(B) Fluorine Treatment>

The production method of the present embodiment includes incorporating fluorine into a negative electrode active material powder. Here, when the negative electrode active material powder into which fluorine is incorporated is formed into a pellet having a density of 1.5 g/cm$^3$, fluorine is incorporated into the negative electrode active material powder so that the pellet has a water contact angle of 96° or more and 138° or less.

Figure 2:
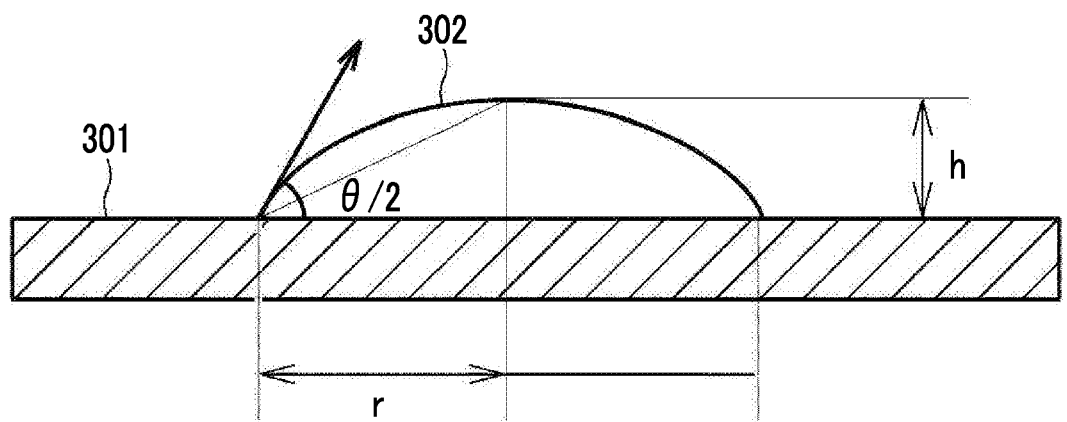
FIG. 2 is a conceptual sectional view for describing a method of measuring a water contact angle.

FIG. 2 is a conceptual sectional view for describing a method of measuring a water contact angle. First, the negative electrode active material powder is filled into a predetermined mold and pressure-molded. Thus, a pellet 301 is prepared. The pellet 301 is molded into, for example, a disc shape. The pellet 301 may have a size at which it can hold a water drop 302. When the pellet 301 has a disc shape, the diameter thereof may be, for example, about 2 cm to 3 cm. The density of the pellet 301 is calculated by dividing the mass of the pellet 301 by the volume of the pellet 301. When the density is calculated, the second decimal place is rounded off. That is, 1.45 g/cm$^3$ or more and 1.54 g/cm$^3$ or less is regarded as 1.5 g/cm$^3$.

The water contact angle is measured at 20° C.±5° C. The water drop 302 is added dropwise to the surface of the pellet 301. An amount of the water drop 302 is set to 0.5 ml±0.1 ml. A water contact angle (θ) is measured within 3 to 5 seconds after the water drop 302 is added dropwise. The water contact angle (θ) is an angle between the tangent line of left and right end points of the water drop 302 and the surface of the pellet 301.

The water contact angle is calculated by the θ/2 method. In the θ/2 method, an angle (θ/2) formed by a straight line connecting the left and right end points of the water drop 302 and the vertex of the water drop 302 and the surface of the pellet 301 is measured, θ/2 is doubled, and thus the water contact angle (θ) is calculated. That is, the water contact angle (θ) is calculated by the following equation: θ=2 arc tan(h/r). In the equation, "h" denotes the shortest distance between the vertex of the water drop 302 and the surface of the pellet 301. "r" denotes the radius (half of the distance between the left end point and the right end point) of the water drop 302. The water contact angle may be measured by, for example, "PG-X+" (commercially available from Matsubo Corporation) or a device equivalent thereto. The water contact angle is measured three times or more. An arithmetic average of the water contact angles that are measured three times or more is used as a measurement result.

When the water contact angle is less than 96°, there is a possibility of the occurrence of coating film defects not being sufficiently reduced. This is thought to be caused by the fact that the negative electrode active material powder does not exhibit sufficient water repellency. Even if the water contact angle exceeds 138°, there is a possibility of the occurrence of coating film defects not being sufficiently reduced. This is thought to be caused by the fact that, since the water repellency of the negative electrode active material powder is too strong, an aqueous solution in which a water-soluble binder powder is dissolved is also repelled by the negative electrode active material powder, and the toughness of the wet granules decreases. The water contact angle is preferably 103° or more and 138° or less. The water contact angle is preferably 96° or more and 136° or less. The water contact angle is more preferably 103° or more and 136° or less. When the water contact angle is within such a range, there is an expectation of further improvement in the capacity retention rate.

As long as the water contact angle can be obtained, fluorine in any state may be incorporated into the negative electrode active material powder. For example, fluorine may be an ion, or may form a molecule or a compound. For example, fluorine may be chemically bonded to the surface of negative electrode active material particles or may be physically adsorbed into pores in the negative electrode active material particles in the form of fluorine ions or fluorine molecules.

For example, when the negative electrode active material powder comes in contact with a fluorine-containing gas, fluorine is incorporated into the negative electrode active material powder. For example, introducing a fluorine-containing gas into a chamber while stirring a negative electrode active material powder in the predetermined chamber can be considered. As the fluorine-containing gas, for example, $CF_4$, $SiF_4$, $NF_3$, $C_2F_6$, $C_3F_8$, $SF_6$, $BF_3$, $XeF_2$, $ClF_3$, $CFAF_2$, and $BrF_5$ may be exemplified. One type of fluorine-containing gas may be used alone or two or more types of fluorine-containing gases may be used in combination. In addition, as a carrier gas, an inert gas such as nitrogen gas, argon gas, or helium gas may be used.

A fluorine-containing gas (for example, $CF_4$ and $NF_3$) may be changed into plasma. It is thought that, when a fluorine radical, a fluorine ion, and the like are generated, a fluorine-containing functional group is likely to be introduced into the surface of the negative electrode active material particles. Thus, it is thought that water repellency appropriate for the present embodiment is likely to be exhibited. In this treatment, for example, a vacuum plasma device, an atmospheric pressure plasma device, or the like is used. The water contact angle may be adjusted by, for example, the type of a fluorine-containing gas, a pressure in a chamber, a treatment time, and a plasma output.

<(C) Granulation>

The production method of the present embodiment includes preparing wet granules by mixing the negative electrode active material powder into which fluorine is incorporated, a water-soluble binder powder, and water.

In the present embodiment, it is thought that, since the negative electrode active material powder treated with fluorine exhibits water repellency, the opportunities for contact between a water-soluble binder powder and water increase, and the water-soluble binder powder is likely to dissolve in the water. Therefore, the spreadability of the wet granules is thought to improve.

A general stirring and mixing device may be used for granulation. For example, a "high speed mixer" (commercially available from Earth Technica Co., Ltd.) or the like may be used as an example. A solid content refers to all components other than a solvent among components included in wet granules. The blending ratio (mass ratio) of the solid content is, for example, the negative electrode active material powder:the water-soluble binder powder=90:10 to 99.9:0.1 (typically, the negative electrode active material powder:the water-soluble binder powder=95:5 to 99:1).

The solid content ratio refers to a mass ratio of the solid content. As the solid content ratio increases, there is less solvent (water). The solid content ratio is not particularly limited as long as the mixture forms wet granules. The solid content ratio is, for example, 65 mass % or more and 80 mass % or less (typically 68 mass % or more and 72 mass % or less). When the solid content ratio is less than 65 mass %, there is a possibility of the mixture becoming pasty depending on physical properties of powder of each material. When the solid content ratio is 80 mass % or less, the spreadability is likely to be higher. Wet granules may include, for example, bulky granules. Wet granules may have, for example, a particle size of about 0.5 mm to 5 mm. A particle size range of granules may be measured by a method according to "JISK0069: sieving test method of chemical products."

The water-soluble binder powder includes water-soluble binder particles. The water-soluble binder particles may be, for example, carboxymethylcellulose (CMC), sodium carboxymethylcellulose (CMC-Na), polyacrylic acid (PAA), sodium polyacrylate (PAA-Na), alginic acid, sodium alginate, polyvinyl alcohol, polyacrylamide (PAM), or polyethylene glycol (PEG). Commercially available water-soluble binder particles may be used. One type of water-soluble binder particle may be used alone or two or more types of water-soluble binder particles may be used in combination.

The water-soluble binder powder may include CMC particles. The CMC particles may have water solubility and stickiness appropriate for the present embodiment. As an index of the stickiness, viscosity (1% aqueous solution viscosity) of an aqueous solution in which 1 mass % of a water-soluble binder powder is dissolved may be exemplified. In the present embodiment, a water-soluble binder powder having a relatively high 1% aqueous solution viscosity is appropriate. A general grade water-soluble binder powder has a 1% aqueous solution viscosity of about 1 mPa·s to 4000 mPa·s. The water-soluble binder powder of the present embodiment may have a 1% aqueous solution viscosity of 4000 mPa·s or more and 10000 mPa·s or less. The 1% aqueous solution viscosity is measured by a B type viscometer at 25° C. A rotational speed of a rotor is 60 rpm. The viscosity is measured three times or more. An arithmetic average of viscosities that are measured three times or more is used as a measurement result. The water-soluble binder powder may have a 1% aqueous solution viscosity of 6000 mPa·s or more and 8000 mPa·s or less.

In the present embodiment, water ($H_2O$) is used as a solvent. As long as water is used, for example, an organic solvent miscible with water may be used in combination with water. As the organic solvent miscible with water, for example, a lower alcohol such as ethanol or isopropyl alcohol, a ketone such as acetone, and an ether such as 1,3-dioxolane or tetrahydrofuran may be exemplified. In consideration of an environmental load, production cost, and the like, it is desirable that water be used alone.

<(D) Production of Negative Electrode>

The production method of the present embodiment includes producing a negative electrode by forming the wet granules into a film form.

The wet granules of the present embodiment exhibits high spreadability. Therefore, it is thought that, when wet granules are formed into a film form, the occurrence of coating film defects is reduced. A method of forming wet granules is not particularly limited. For example, forming wet granules into a film form by formation through rollers can be considered.

Figure 3:
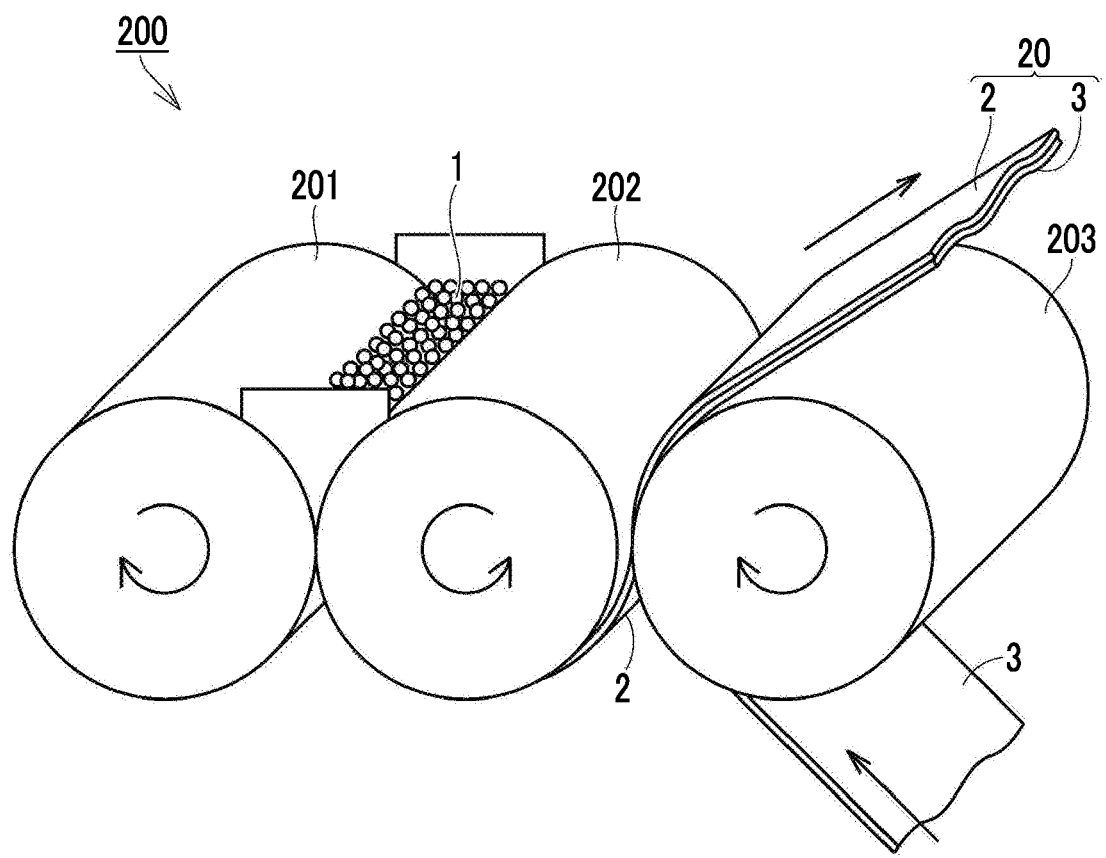
FIG. 3 is a diagram schematically showing an example of a configuration of a coating device.

FIG. 3 is a diagram schematically showing an example of a configuration of a coating device. A coating device 200 includes three rotating rollers. That is, the coating device 200 includes a first rotating roller 201, a second rotating roller 202, and a third rotating roller 203. Curved arrows drawn on rotating rollers indicate rotation directions of the rotating rollers. The first rotating roller 201, the second rotating roller 202, and the third rotating roller 203 are disposed so that rotation axes are parallel to each other. For example, the second rotating roller 202 rotates at a higher peripheral speed than the first rotating roller 201. For example, the third rotating roller 203 rotates at a higher peripheral speed than the second rotating roller 202.

Wet granules 1 are supplied to a roller gap between the first rotating roller 201 and the second rotating roller 202. In the roller gap, the wet granules 1 are consolidated to form an electrode film 2. That is, when the wet granules 1 pass through the roller gap, the wet granules 1 are formed into a film form. The electrode film 2 may be formed to have, for example, a thickness of 10 μm to 100 μm.

The second rotating roller 202 supplies the electrode film 2 to a roller gap between the second rotating roller 202 and the third rotating roller 203. The third rotating roller 203 supplies a current collector 3 to the roller gap between the second rotating roller 202 and the third rotating roller 203. The current collector 3 may be, for example, a copper (Cu) foil. The Cu foil may be a pure Cu foil or a Cu alloy foil. The current collector 3 may have, for example, a thickness of 5 μm to 30 μm.

When the electrode film 2 and the current collector 3 pass through the roller gap, the electrode film 2 is rubbed against the surface of the current collector 3. Thus, the electrode film 2 is transferred to the surface of the current collector 3. That is, the electrode film 2 is disposed on the surface of the current collector 3 according to roller transfer. Thus, a negative electrode 20 is produced. It is thought that, since the spreadability of the electrode film 2 (the wet granules 1 formed into a film form) is also high during the roller transfer, the occurrence of coating film defects is reduced.

In the formation through rollers and roller transfer, strong shear stress is applied to the surface of the electrode film 2. Therefore, there is a possibility of defects such as cracking of negative electrode active material particles or crushing of negative electrode active material particles occurring on the surface of the electrode film 2. When the negative electrode active material particles crack, there is a possibility of a newly generated surface being exposed and a capacity retention rate decreasing. In addition, when the negative electrode active material particles are the above-described composite particles, amorphous carbon may be separated from the surface of natural graphite and a desired coating effect may not be obtained. In the present embodiment, it is thought that, since the spreadability of the wet granules 1 is high, shear stress is alleviated, and cracking of negative electrode active material particles is reduced.

Cracking and crushing of negative electrode active material particles may be evaluated by glossiness on the surface of the negative electrode. It is thought that, as the glossiness decreases, there are fewer cracks of negative electrode active material particles. That is, there is an expectation of improvement in the capacity retention rate. The glossiness indicates 60-degree specular glossiness. The glossiness is measured by a method according to "JISZ8741: method of measuring specular glossiness." The glossiness is measured three times or more. An arithmetic average of glossinesses that are measured three times or more is used as a measurement result. In the present embodiment, it is possible to produce a negative electrode so that the glossiness is 2.1% or more and 2.4% or less (preferably 2.1% or more and 2.2% or less). When the glossiness is 2.4% or less, there is an expectation of further improvement in the capacity retention rate.

The electrode film 2 may be disposed on both surfaces of the current collector 3. After the electrode film 2 is disposed on the current collector 3, the electrode film 2 is dried. For example, a hot air drying furnace, an infrared drying furnace, or the like may be used for drying. The electrode film 2 may be naturally dried. After drying, the negative electrode 20 may be rolled to a predetermined thickness according to specifications of a battery 100 or may be cut into a predetermined shape (for example, a band shape or a rectangular shape).

<(E) Production of Battery>

The production method of the present embodiment includes producing a lithium ion secondary battery including a negative electrode, a positive electrode, and an electrolytic solution. In the present embodiment, it is thought that, since coating film defects of the negative electrode are reduced, a lithium ion secondary battery having a high capacity retention rate is produced.

Figure 4:
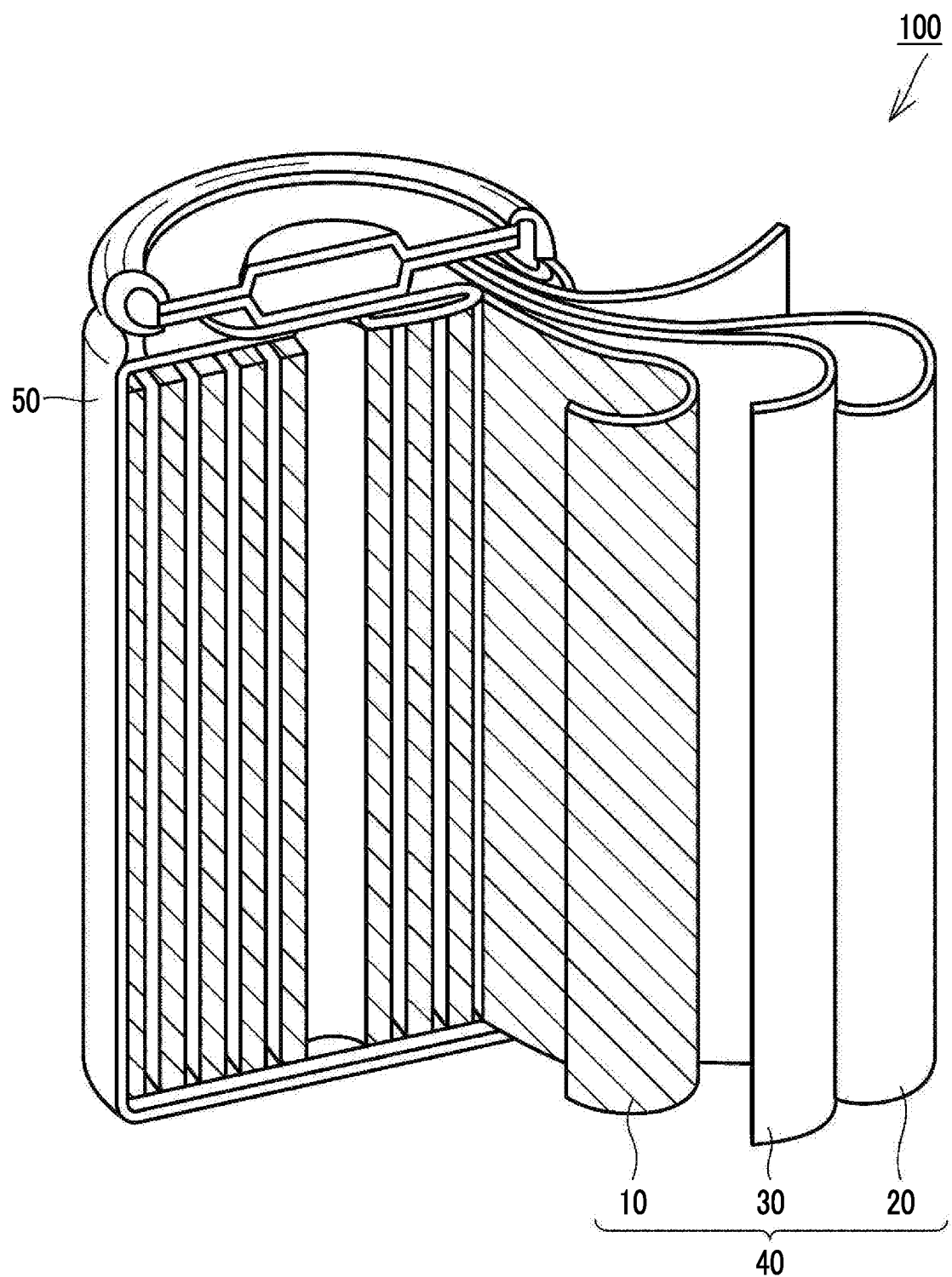
FIG. 4 is a diagram schematically showing an example of a configuration of a lithium ion secondary battery according to an embodiment of the present disclosure.

FIG. 4 is a diagram schematically showing an example of a configuration of a lithium ion secondary battery according to an embodiment of the present disclosure. The battery 100 includes the negative electrode 20, a positive electrode 10, and an electrolytic solution (not shown). The battery 100 further includes a separator 30. That is, the battery of the present embodiment may further include a separator.

In the battery 100, all of the positive electrode 10, the negative electrode 20, and the separator 30 are belt-type sheets. The positive electrode 10, the negative electrode 20, the separator 30, and the electrolytic solution are stored in an exterior body 50. The exterior body 50 may be made of a metal material such as Al or stainless steel or made of a composite material including a metal material and a resin material (for example, an Al laminate film).

The battery 100 is a cylindrical battery. However, the battery of the present embodiment is not limited to a cylindrical battery. The battery may be a square type battery or a laminate type battery.

(Production of Positive Electrode)

The positive electrode 10 may be produced by a known method. For example, a paste may be prepared by mixing a positive electrode active material powder, a conductive powder, a binder, and a solvent. When the paste is applied to the surface of the current collector and dried, the positive electrode 10 may be produced.

The material used for producing the positive electrode 10 is not particularly limited. The current collector may be, for example, an aluminum (Al) foil. Positive electrode active material particles may be, for example, a Li-containing metal oxide such as $LiCoO_2$, $LiNiO_2$, $LiMnO_2$, $LiMn_2O_4$, or $LiNi_{1/3}Co_{1/3}Mn_{1/3}O_2$ or a Li-containing phosphate such as $LiFePO_4$. The conductive powder may be, for example, acetylene black, thermal black, furnace black, vapor-grown carbon fibers (VGCFs), or graphite. The binder may be, for example, polyvinylidene fluoride (PVdF) or polytetrafluoroethylene (PTFE). The solvent may be, for example, N-methyl-2-pyrrolidone (NMP).

(Configuration of Electrode Group)

The separator 30 is prepared. The separator 30 is an electrically insulating porous film. The separator 30 may be made of, for example, polyethylene (PE) or polypropylene (PP). The separator 30 may have a multilayer structure. For example, the separator 30 may be formed by laminating a PP porous film, a PE porous film, and a PP porous film in this order. The separator 30 may include a heat resistant layer on its surface. The heat resistant layer may include, for example, a high melting point material such as alumina.

The positive electrode 10 and the negative electrode 20 are laminated with the separator 30 interposed therebetween and furthermore these are wound. Thus, an electrode group 40 (a wound type electrode group) is formed. The electrode group 40 is inserted into the exterior body 50. The electrode group 40 is electrically connected to an external terminal. In the square type battery and laminate type battery, the electrode group may be a laminate type electrode group.

(Injection)

An electrolytic solution is injected into the exterior body 50. The electrolytic solution is impregnated into the electrode group 40. The exterior body 50 is sealed. Thus, the battery 100 is produced.

The electrolytic solution includes a solvent and a Li salt. The solvent is aprotic. The solvent is, for example, a solvent in which a cyclic carbonate and a chain carbonate are mixed. The mixing ratio between the cyclic carbonate and the chain carbonate may be, for example, the cyclic carbonate:the chain carbonate=1:9 to 5:5 (volume ratio).

As the cyclic carbonate, for example, ethylene carbonate (EC), propylene carbonate (PC), butylene carbonate (BC), and fluoroethylene carbonate (FEC) may be exemplified. One type of cyclic carbonate may be used alone or two or more types of cyclic carbonates may be used in combination. As the chain carbonate, dimethyl carbonate (DMC), ethyl methyl carbonate (EMC), and diethyl carbonate (DEC) may be exemplified. One type of chain carbonate may be used alone or two or more types thereof may be used in combination.

The solvent may include, for example, lactone, a cyclic ether, a chain ether, and a carboxylic acid ester. As the lactone, for example, γ-butyrolactone (GBL), and δ-valerolactone may be exemplified. As the cyclic ether, for example, tetrahydrofuran (THF), 1,3-dioxolane, and 1,4-dioxane may be exemplified. As the chain ether, 1,2-dimethoxyethane (DME) may be exemplified. As the carboxylic acid ester, for example, methyl formate (MF), methyl acetate (MA), and methyl propionate (MP) may be exemplified.

The electrolytic solution may include, for example, a Li salt at 0.5 mol/l to 2.0 mol/l. The Li salt is dissolved in a solvent. The Li salt functions as a supporting electrolyte. As the Li salt, for example, $LiPF_6$, $LiBF_4$, $Li[N(FSO_2)_2]$, and $Li[N(CF_3SO_2)_2]$ may be exemplified. One type of lithium salt may be used alone or two or more types thereof may be used in combination.

The electrolytic solution may include various functional additives in addition to the solvent and the Li salt. The electrolytic solution may include, for example, a functional additive at 1 mass % to 5 mass %. As the functional additive, for example, a gas generating agent (overcharge additive) and a film forming agent may be exemplified. As the gas generating agent, for example, cyclohexylbenzene (CHB) and biphenyl (BP) may be exemplified. As the film forming agent, for example, vinylene carbonate (VC), vinyl ethylene carbonate (VEC), $Li[B(C_2O_4)_2]$ (commonly called "LiBOB"), $LiPO_2F_2$, propanesultone (PS), and ethylene sulfite (ES) may be exemplified.

Examples will be described below. However, the following examples do not limit the scope of the present disclosure.

Example 1

<(A) Preparation of Negative Electrode Active Material Powder>

A composite particle powder was prepared as a negative electrode active material powder. The composite particles include natural graphite and amorphous carbon covering the surface of the natural graphite. In the following Table 1, the composite particles are described as "amorphous-coated natural graphite." According to the above-described method, a BET specific surface area of the negative electrode active material powder was measured. The results are shown in the following Table 1.

<(B) Fluorine Treatment>

A vacuum plasma device for powder (commercially available from Sakigake Semiconductor Co., Ltd.) was prepared. The negative electrode active material powder was disposed in a chamber. A fluorine-containing gas was changed to plasma. The generated plasma was emitted to the negative electrode active material powder. Therefore, fluorine was incorporated into the negative electrode active material powder. After the fluorine treatment, a water contact angle was measured according to the above-described method. The results are shown in the following Table 1.

Fluorine treatment conditions (plasma treatment conditions) were as follows.
Gas: $CF_4$
Pressure in chamber: 100 Pa
Output: 300 W
Treatment time: 1 min <(C) Granulation>

The following materials and the like were prepared.
Water-soluble binder powder: CMC (Sunrose "MAC800LC," commercially available from Nippon Paper Industries Co., Ltd.)

Stirring and mixing device: food processor (commercially available from Yamamoto Electric Corporation)

The negative electrode active material powder treated with fluorine, the water-soluble binder powder, and water (deionized water) were mixed by the stirring and mixing device to prepare wet granules. The solid content ratio was set to 70 mass %. The blending ratio of the solid content was the negative electrode active material powder:the water-soluble binder powder=97:3 (mass ratio).

<(D) Production of Negative Electrode>

The coating device 200 shown in FIG. 3 was prepared. The wet granules 1 obtained above were supplied to the roller gap between the first rotating roller 201 and the second rotating roller 202. When the wet granules 1 passed through the roller gap, the wet granules 1 were formed into a film form. Thus, the electrode film 2 was formed. Moreover, when the electrode film 2 was disposed on the surfaces (both front and rear surfaces) of the current collector 3, the negative electrode 20 was produced. The negative electrode 20 was dried. The negative electrode 20 was rolled and cut into a predetermined shape.

<(E) Production of Battery>

A positive electrode was prepared. $LiNi_{1/3}Co_{1/3}Mn_{1/3}O_2$ was used as positive electrode active material particles. A PE porous film was prepared as a separator. The positive electrode and the negative electrode were laminated with the separator interposed therebetween to form a laminate type electrode group. A bag made of an Al laminate film was prepared as an exterior body. The electrode group was inserted into the exterior body.

An electrolytic solution including the following components was prepared.
Solvent: [EC:DMC:EMC=3:3:4 (volume ratio)]
Li salt: $LiPF_6$ (1.0 mol/l)

The electrolytic solution was injected into the exterior body. An opening of the exterior body was sealed by a heat sealer to seal the exterior body. Accordingly, a battery (laminate type lithium ion secondary battery) was produced.

Comparative Example 1

A battery was produced in the same production method as in Example 1 except that no fluorine treatment was performed on the negative electrode active material powder.

Examples 2 and 3 and Comparative Example 2

Batteries were produced in the same production method as in Example 1 except that a treatment time of a fluorine treatment was changed as shown in the following Table 1.

Examples 4 and 5 and Comparative Examples 3 and 4

Batteries were produced in the same production method as in Example 3 except that a negative electrode active material powder having a BET specific surface area shown in the following Table 1 was prepared.

Evaluation

<Film Quality>

The number of coating film defects (pinholes and streaks) present in a range of 1 m in a progression direction of the current collector 3 in the coating device 200 was counted. The film quality of the electrode film (coating film) was evaluated in the following three levels (A, B, and C). The results are shown in the following Table 1.
A: there were no coating film defects
B: the number of coating film defects was 1 or more and less than 5
C: the number of coating film defects was 5 or more <Glossiness>

The glossiness of the negative electrode 20 was measured according to the above-described method. The results are shown in the following Table 1. As the glossiness was lowered, the number of the negative electrode active material particles cracked and crushing of the negative electrode active material particle crushed on the surface of the negative electrode 20 was reduced.

<Capacity Retention Rate>

Initial capacities of the batteries were measured. States of charges (SOCs) of the batteries were adjusted to 80%. One round of the following pulse charging and pulse discharging was defined as 1 cycle, and 200 cycles were performed. Here, "1 C" indicates a current rate at which the full charging capacity of a battery is discharged in 1 hour.
Pulse charging: 50 C×5 seconds
Pulse discharging: 50 C×5 seconds After 200 cycles were completed, the capacity after the cycles was measured. The capacity retention rate was calculated by dividing the capacity after the cycles by the initial capacity. The results are shown in the following Table 1.

(a) The negative electrode active material powder has a BET specific surface area of 2.2 $m^2$/g or more and 5.2 $m^2$/g or less.

(b) The negative electrode active material powder treated with fluorine has a water contact angle of 96° or more and 138° or less.

The embodiments and examples are only examples and should not be considered as restrictions. The scope of the present disclosure is defined by the appended claims and is intended to encompass equivalents of the scope of the appended claims and all modifications falling within the scope of the appended claims.

What is claimed is:

1. A method of producing a lithium ion secondary battery comprising:
   preparing a negative electrode active material powder having a BET specific surface area of 2.2 $m^2$/g or more and 5.2 $m^2$/g or less;
   incorporating fluorine into the negative electrode active material powder;
   preparing wet granules by mixing the negative electrode active material powder into which fluorine is incorporated, a water-soluble binder powder, and water;

TABLE 1

List of examples and comparative examples

| | (A) Preparation of negative electrode active material powder | | (B) Fluorine treatment | | | (C) Granulation | | | (D) Production of negative electrode | | (E) Production of battery |
|---|---|---|---|---|---|---|---|---|---|---|---|
| | Composite particles | BET specific surface area [$m^2$/g] | Gas | Treatment time [min] | Water contact angle [°] | Binder | Active material:binder (mass ratio) | Solid content ratio [mass %] | Film quality | Glossiness [%] | Capacity retention rate [%] |
| Comparative Example 1 | Amorphous-coated natural graphite | 3.8 | — | — | 80 | CMC | 97:3 | 70 | C | 4 | 65 |
| Example 1 | Amorphous-coated natural graphite | 3.8 | $CF_4$ | 1 | 96 | CMC | 97:3 | 70 | B | 2.4 | 90 |
| Example 2 | Amorphous-coated natural graphite | 3.8 | $CF_4$ | 5 | 103 | CMC | 97:3 | 70 | A | 2.2 | 93 |
| Example 3 | Amorphous-coated natural graphite | 3.8 | $CF_4$ | 30 | 136 | CMC | 97:3 | 70 | A | 2.1 | 94 |
| Comparative Example 2 | Amorphous-coated natural graphite | 3.8 | $CF_4$ | 90 | 157 | CMC | 97:3 | 70 | B | 3.5 | 72 |
| Comparative Example 3 | Amorphous-coated natural graphite | 1.9 | $CF_4$ | 30 | 135 | CMC | 97:3 | 70 | C | 3.5 | 82 |
| Example 4 | Amorphous-coated natural graphite | 2.2 | $CF_4$ | 30 | 138 | CMC | 97:3 | 70 | A | 2.2 | 91 |
| Example 5 | Amorphous-coated natural graphite | 5.2 | $CF_4$ | 30 | 136 | CMC | 97:3 | 70 | A | 2.4 | 90 |
| Comparative Example 4 | Amorphous-coated natural graphite | 6.1 | $CF_4$ | 30 | 134 | CMC | 97:3 | 70 | B | 3.8 | 70 |

<Results>

As shown in the following Table 1, the examples in which the following conditions (a) and (b) were satisfied had an improved capacity retention rate compared to the comparative examples in which the same conditions were not satisfied. It is thought that, since the negative electrode active material powder exhibited moderate water repellency, the opportunities for contact between a water-soluble binder powder and water increased during granulation, and the water-soluble binder powder was likely to dissolve in the water.

producing a negative electrode by forming the wet granules into a film form; and
producing a lithium ion secondary battery including the negative electrode, a positive electrode, and an electrolytic solution,
wherein, when fluorine is incorporated into the negative electrode active material powder and formed into a pellet having a density of 1.5 g/$cm^3$, the pellet has a water contact angle of 96° or more and 138° or less; and
the wet granules have a particle size of 0.5 mm to 5 mm.

2. The method of producing the lithium ion secondary battery according to claim 1, wherein, when the wet granules pass through a roller gap, the wet granules are formed into the film form.

3. The method of producing the lithium ion secondary battery according to claim 1, wherein
the negative electrode active material powder includes composite particles,
the composite particles include natural graphite and amorphous carbon, and
the amorphous carbon covers the surface of the natural graphite.

4. The method of producing the lithium ion secondary battery according to claim 1, wherein
the water-soluble binder powder includes carboxymethylcellulose particles.

5. The method of producing the lithium ion secondary battery according to claim 1, wherein
fluorine is incorporated into the negative electrode active material powder through contact with a fluorine-containing gas.

6. The method of producing the lithium ion secondary battery according to claim 5, wherein
the fluorine-containing gas is changed to plasma.

7. The method of producing the lithium ion secondary battery according to claim 1, wherein
a solid content ratio of the wet granules is 65 mass % or more and 80 mass % or less.

* * * * *